US012537277B2

(12) United States Patent
Lee et al.

(10) Patent No.: US 12,537,277 B2
(45) Date of Patent: Jan. 27, 2026

(54) SUBSTRATE INTEGRATED WAVEGUIDE HAVING MULTIPLE SUBSTRATES

(71) Applicant: Alpha Networks Inc., Hsinchu (TW)

(72) Inventors: Yi-Ju Lee, Hsinchu (TW); Ding-Bing Lin, Hsinchu (TW); Yi-Han Wu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 70 days.

(21) Appl. No.: 18/660,257

(22) Filed: May 10, 2024

(65) Prior Publication Data

US 2025/0079678 A1 Mar. 6, 2025

(30) Foreign Application Priority Data

Aug. 30, 2023 (TW) ................................ 112132735

(51) Int. Cl.
*H01P 3/12* (2006.01)

(52) U.S. Cl.
CPC .................................. *H01P 3/121* (2013.01)

(58) Field of Classification Search
CPC ........ H01Q 1/38; H01Q 1/50; H01Q 21/0006; H01Q 1/48; H01Q 21/24; H01Q 1/36; H01Q 21/065; H01Q 1/241; H01Q 21/061; H01Q 13/10; H01Q 9/045; H01Q 3/34; H01Q 9/0407; H01Q 13/106; H01Q 13/18; H01Q 13/20; H01Q 9/0414; H01Q 1/52; H01Q 15/0086; H01Q 21/062; H01Q 1/523; H01Q 21/0075; H01Q 9/16; H01Q 15/24; H01Q 21/00; H01Q 21/064; H01Q 9/0442; H01Q 21/005; H01Q 23/00; H01Q 3/443; H01Q 1/002; H01Q 21/06; H01Q 21/30;
(Continued)

(56) References Cited

U.S. PATENT DOCUMENTS 6,515,562 B1 * 2/2003 Takenoshita ............ H01P 3/121
333/248
10,374,324 B2 * 8/2019 Stevenson ................. H03J 3/02
(Continued)

FOREIGN PATENT DOCUMENTS

CN 115995693 4/2023
CN 116190959 5/2023
(Continued)

OTHER PUBLICATIONS

JPA OA issued on May 14, 2025.
(Continued)

*Primary Examiner* — John W Poos
(74) *Attorney, Agent, or Firm* — WPAT, PC

(57) ABSTRACT

A substrate integrated waveguide having multiple substrate comprises a first substrate and a second substrate stacked with the first substrate, wherein metal layers are formed on opposite sides of the first substrate and opposite sides of the second substrate, a plurality of metal holes are formed between two metal layers of the same substrate to limit transmission paths of electromagnetic waves transmitted in the substrate, and areas having no metal therein are formed between the first and second substrates so that the electromagnetic waves could be transmitted between the first and second substrates thereby.

6 Claims, 13 Drawing Sheets

(58) Field of Classification Search

CPC .. H01Q 3/26; H01Q 3/30; H01Q 5/50; H01Q 1/22; H01Q 1/243; H01Q 1/42; H01Q 1/526; H01Q 13/02; H01Q 21/08; H01Q 5/10; H01Q 5/20; H01Q 5/28; H01Q 9/0428; H01Q 9/285; H01Q 15/002; H01Q 15/0026; H01Q 19/06; H01Q 19/30; H01Q 21/067; H01Q 25/001; H01Q 9/0464; H01Q 9/0485; H01Q 1/246; H01Q 1/422; H01Q 13/06; H01Q 13/08; H01Q 13/22; H01Q 15/14; H01Q 15/16; H01Q 3/00; H01Q 5/307; H01Q 5/35; H01Q 5/40; H01Q 9/04; H01Q 9/0421; H01Q 9/0457; H01Q 1/12; H01Q 1/2208; H01Q 1/2266; H01Q 1/2283; H01Q 1/273; H01Q 1/28; H01Q 1/3233; H01Q 1/521; H01Q 13/00; H01Q 13/28; H01Q 15/00; H01Q 15/0053; H01Q 19/02; H01Q 19/10; H01Q 19/104; H01Q 19/22; H01Q 21/0087; H01Q 21/293; H01Q 25/002; H01Q 3/40; H01Q 5/30; H01Q 5/342; H01Q 5/378; H01Q 5/55; H01Q 9/0492; H01Q 1/24; H01Q 1/288; H01Q 1/32; H01Q 13/206; H01Q 15/244; H01Q 19/24; H01Q 21/0037; H01Q 21/0093; H01Q 3/36; H01Q 3/44; H01Q 5/25; H01Q 5/321; H01Q 5/42; H01Q 7/00; H01Q 9/0435; H01Q 9/28; H01P 1/2088; H01P 1/208; H01P 1/203; H01P 1/207; H01P 1/20; H01P 5/12; H01P 7/065; H01P 3/081; H01P 3/18; H01P 5/08; H01P 5/16; H01P 7/082; H01P 3/121; H01P 1/20318; H01P 11/002; H01P 3/12; H01P 5/022; H01P 5/024; H01P 7/00; H01P 1/184; H01P 3/16; H01P 5/184; H01P 7/10; H01P 1/042; H01P 1/16; H01P 1/20309; H01P 1/2082; H01P 5/00; H01P 5/02; H01P 5/10; H01P 5/107; H01P 5/181; H01P 1/20327; H01P 1/20345; H01P 1/213; H01P 1/2138; H01P 11/00; H01P 11/001; H01P 11/007; H01P 3/00; H01P 3/06; H01P 3/08; H01P 3/082; H01P 5/18; H01P 7/06; H01P 7/088; H01P 9/003

See application file for complete search history.

(56) References Cited

U.S. PATENT DOCUMENTS

| | | | | |
|---|---|---|---|---|
| 11,658,378 | B2 | 5/2023 | Myers et al. | |
| 2009/0220240 | A1 | 9/2009 | Abhari et al. | |
| 2015/0318618 | A1* | 11/2015 | Chen .................... | H01P 7/082 343/750 |
| 2021/0084800 | A1 | 3/2021 | Yan et al. | |
| 2021/0111472 | A1* | 4/2021 | Myers .................. | H05K 1/0253 |
| 2022/0069455 | A1 | 3/2022 | Tang et al. | |
| 2022/0407200 | A1 | 12/2022 | Chattopadhyay et al. | |

FOREIGN PATENT DOCUMENTS

| | | |
|---|---|---|
| CN | 116417765 | 7/2023 |
| JP | 2023026285 | 2/2023 |
| TW | 202211535 | 3/2022 |
| WO | 2019190396 | 10/2019 |

OTHER PUBLICATIONS

M. N. Hafiz, et al., "Design of a rectangular slot coupling for effective transition between two layers of SIW.", 2015 IEEE International RF and Microwave Conference (RFM), 2015, pp. 40-44, DOI: 10.1109/RFM. 2015.5787708.

European Patent Office , "European search report", issued on Oct. 25, 2024.

D.V. Navarro-Mendez et. al., "Two Layer Slot-Antenna Array in SIW Technology", Proceedings of the 40th European Microwave Conference, pp. 1492-1495, XP093214810, Sep. 28, 2010.

Han Tao et. al., "Millimeter-Wave High-Gain Substrate Integrated Multi-Slot Antenna Array with A Low Cross Polarization Leve", IEEE, 2020 International Conference on Microwave and Millimeter Wave Technology, pp. 1-3, XP033892506, Sep. 20, 2020.

Kai-Da Xu, Xenxun Li and Yanhui Liu, "Dual-Frequency SIW Cavity-Backed Slot Antenna Using Two High-Order Modes", IEEE, 2017 Sixth Asia—[Acific Conference on Antennas and Propagation, pp. 1-3, XP033376387, Oct. 16, 2017.

JPO OA issued on Sep. 3, 2025.

* cited by examiner

SUBSTRATE INTEGRATED WAVEGUIDE HAVING MULTIPLE SUBSTRATES

FIELD OF THE INVENTION

The present invention relates to a substrate integrated waveguide. More specifically, the present invention relates to a substrate integrated waveguide with multiple substrates.

BACKGROUND OF THE INVENTION

The micro-transmission structures commonly used for signal transmission include microstrip and stripline. Compared with general waveguide structure, the micro-transmission structures are simpler to be integrated into circuits because of the small size, and, therefore, the size of the electronic components could be reduced. However, the small size of the micro-transmission structures results the issues of lower capability of power handling and greater energy loss.

In order to solve the issues described above, a technique solution known as substrate integrated waveguide (SIW) is provided. It has been found after a long period of verification that the substrate integrated waveguide is suitable for being integrated with various planar circuits to produce small electronic components while keeping the advantages of the traditional waveguide, such as low energy loss and high capability of power handling.

Because the substrate integrated waveguide might be widely used in the electronic components in the future due to the benefits above, it is very important to do any improvements thereon.

SUMMARY OF THE INVENTION

Accordingly, the present invention provides a substrate integrated waveguide in the following descriptions to make the circuit layout be more flexible.

In one aspect, the present invention provides a substrate integrated waveguide having multiple substrates, which comprises a first substrate and a second substrate. The first substrate has a first dielectric layer, a first metal layer and a second metal layer disposed on opposite sides of the first dielectric layer, and a plurality of first metal holes disposed in the first dielectric layer, wherein the first metal holes are arranged into a plurality of first hole-rows along a first direction in which an electromagnetic wave is transmitted in the first dielectric layer, and two terminals of each of the first metal holes are connected to the first metal layer and the second metal layer, respectively. The second substrate has a second dielectric layer, a third metal layer and a fourth metal layer disposed on opposite sides of the second dielectric layer, and a plurality of second metal holes disposed in the second dielectric layer, wherein the second metal holes are arranged into a plurality of second hole-rows along a second direction in which the electromagnetic wave is transmitted in the second dielectric layer, and two terminals of each of the second metal holes are connected to the third metal layer and the fourth metal layer, respectively. Wherein, the first substrate is stacked with the second substrate, the second metal layer faces the third metal layer, there is no metal within a first metal-less area of the second metal layer and a second metal-less area of the third metal layer such that the electromagnetic wave is transmitted between the first substrate and the second substrate through the first metal-less area and the second metal-less area, a first structure configured for transmitting and receiving the electromagnetic wave is disposed near a first side of the first metal-less area, and a plurality of third metal holes are disposed near a second side of the first metal-less area and arranged into a third hole-row along a third direction perpendicular to the first direction, wherein the first side and the second side are opposite sides of the first metal-less area.

In one embodiment, an amount of the first hole-rows is the same as an amount of the second hole-rows.

In one embodiment, an amount of the first hole-rows is not the same as an amount of the second hole-rows.

In one embodiment, a second structure configured for transferring the electromagnetic waves is disposed on the second substrate near one side of the second metal-less area.

In one embodiment, a third structure configured for transferring the electromagnetic waves is disposed on the second substrate near two sides of the second metal-less area.

In one embodiment, the second metal layer and the third metal layer are integrated as one metal layer.

In one embodiment, the first metal-less area on the second metal layer is an area on which a predetermined area is vertically projected, and the second metal-less area on the third metal layer is an area on which the predetermined area is vertically projected.

By applying the technique solutions described above, the substrate integrated waveguide having multiple substrates provided in the present invention could transmit signals in different substrates in the same direction or in different directions. Therefore, the circuit design made for an electronic component using the substrate integrated waveguide could be more flexible than before.

DETAILED DESCRIPTION OF PREFERRED EMBODIMENTS

Figure 1:
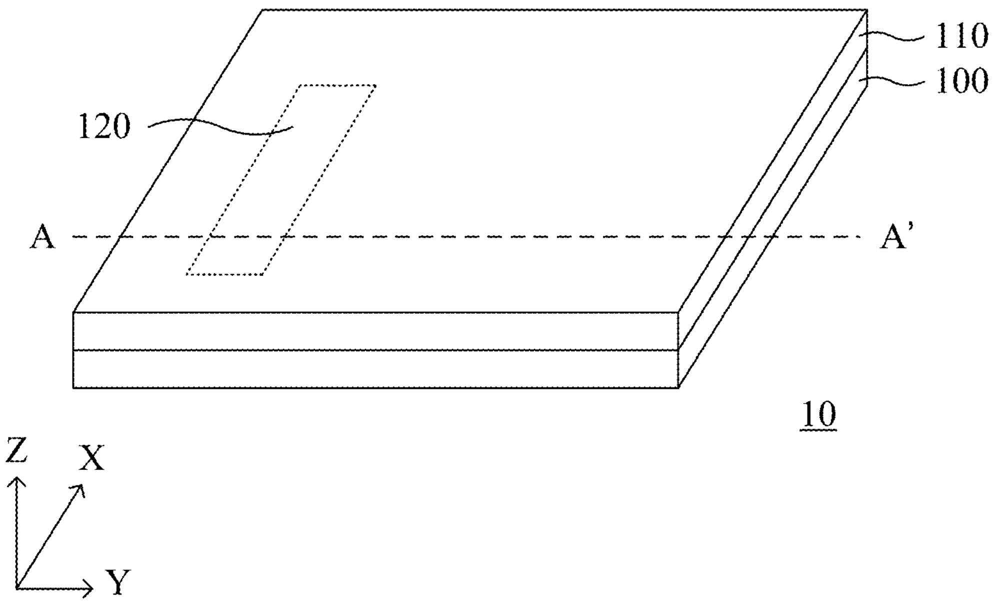
FIG. 1 is a schematic diagram showing outward appearance of a substrate integrated waveguide having multiple substrates in accordance with one embodiment of the present invention.

Please refer to FIG. 1, which is a schematic diagram showing outward appearance of a substrate integrated waveguide having multiple substrates in accordance with one embodiment of the present invention. In this embodiment, the substrate integrated waveguide 10 comprises two substrates 100 and 110, wherein the substrate 100 is stacked with the substrate 110, that is, there exists at least one line extending along the Z-axis direction and passing through the substrates 100 and 110. It should be noted that although the substrate 100 is fully stacked with the substrate 110 in this embodiment, the substrate 100 could be not fully stacked with the substrate 110 in other embodiments, for example, it is possible that the size of the substrate 100 is different from that of the substrate 110, or it is also possible that one of the substrates could be extended along a certain direction such that the edge of the substrate is beyond the edge of the other substrate.

To be a substrate integrated waveguide, it is necessary that transmission of electromagnetic waves within the substrate integrated waveguide 10 is allowed. Therefore, each of the substrates 100 and 110 should be a waveguide structure suitable for transmitting electromagnetic waves, and an electromagnetic wave transmission channel through which the electromagnetic waves could be transmitted must be built between the substrates 100 and 110 such that the electromagnetic waves could be transmitted across the substrates 100 and 110. In this embodiment, for making the substrate 100 be a waveguide structure, metal layers are disposed at both the top side and the bottom side of the substrate 100, and a plurality of metal holes are disposed between the two metal layers and arranged along the direction in which the electromagnetic waves are supposed to be transmitted in the substrate 100. Similarly, for making the substrate 110 be a waveguide structure, metal layers are disposed at both the top side and the bottom side of the substrate 110, and a plurality of metal holes are disposed between the two metal layers and arranged along the direction in which the electromagnetic waves are supposed to be transmitted in the substrate 110. Furthermore, a metal-less area 120 in which no metal exists is disposed between the substrates 100 and 110 such that transmission of electromagnetic waves from the substrate 100 to the substrate 110 or from the substrate 110 to the substrate 100, i.e., transmission of electromagnetic waves across the substrates 100 and 110, could be achieved thereby.

It should be noted that the metal-less area 120 is not visible from outward appearance of the substrate integrated waveguide 10 because the metal-less area 120 is formed between the substrates 100 and 110. Therefore, the metal-less area 120 in FIG. 1 is drawn by using dotted lines. In the following figures, the structures that exists inside the component shown in the figure but is not visible from outward appearance would be drawn by using dotted lines as that used for drawing the metal-less area 120 in FIG. 1.

For the convenience of description, it is set that the electromagnetic waves enter the substrate integrated waveguide 10 from the right side of the substrate 100 in the Y-axis direction and leave the substrate integrated waveguide 10 from the right side of the substrate 110 in the Y-axis in the following embodiments. Therefore, a structure configured for receiving electromagnetic waves could be formed to connect to the right side of the substrate 100 in the Y-axis direction, and a structure configured for sending electromagnetic waves could be formed to connect to the right side of the substrate 110 in the Y-axis direction. It should be noted that the locations where the electromagnetic waves enter or leave the substrate integrated waveguide 10 are not limitations of the present invention. On the contrary, those with ordinary skill in the art could adjust the structure of the substrate integrated waveguide 10 in accordance with the technique solutions provided in the present invention to achieve a predetermined transmission result of the electromagnetic waves when the locations where the electromagnetic waves enter or leave the substrate integrated waveguide 10 are changed.

Figure 2A:
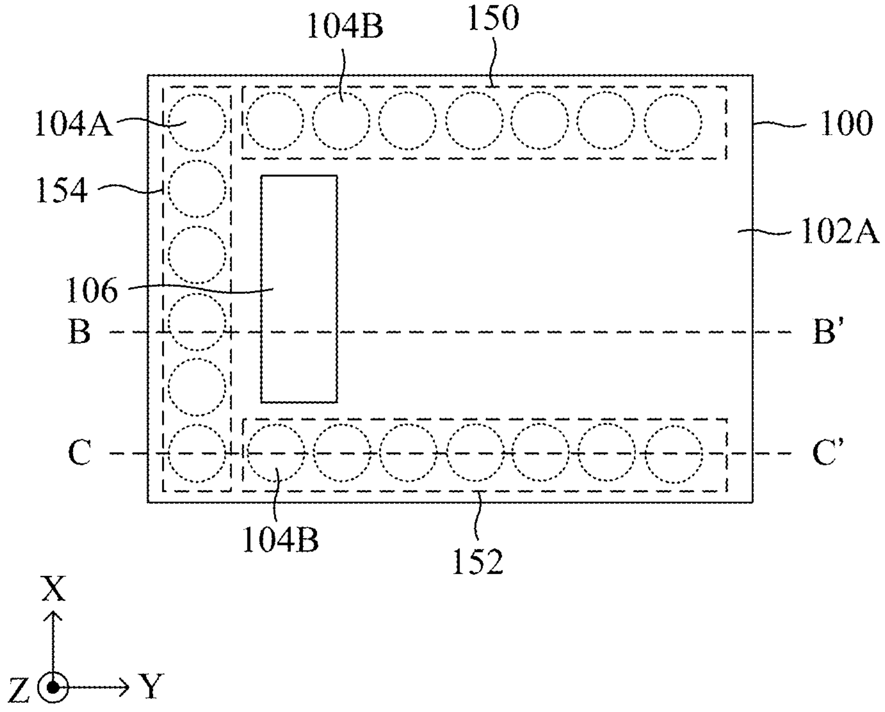
FIG. 2A is a top view of the substrate 100 shown in FIG. 1 in accordance with one embodiment of the present invention.

Please also refer to FIG. 2A, which is a top view of the substrate 100 shown in FIG. 1 in accordance with one embodiment of the present invention. As shown in FIG. 2A, a metal layer 102A is disposed above the upper surface of the substrate 100, a metal layer is disposed below the lower surface of the substrate 100, a metal-less area 106 in which no metal exists is formed within the metal layer 102A, and a plurality of metal holes 104A and 104B are formed below the metal layer 102A in the Z-axis direction. The metal holes 104B are arranged into two hole-rows 150 and 152 along the Y-axis direction, each of the hole-rows 150 and 152 comprises at least two of the metal holes 104B, and the hole-row 150 is separated from the hole-row 152 for a certain distance so that the electromagnetic waves could be transmitted along the Y-axis direction between the space formed between the hole-rows 150 and 152. Furthermore, the metal holes 104A are arranged into a hole-row 154 along the X-axis direction at left side of the metal-less area 106 in the Y-axis direction, so that the hole-row 154 could form a barrier when the electromagnetic waves are transmitted along the Y-axis direction, and interference on electromagnetic waves from outside of the substrate integrated waveguide 10 and probability of dissipation of electromagnetic waves inside the substrate integrated waveguide 10 could be reduced thereby.

Figure 2B:
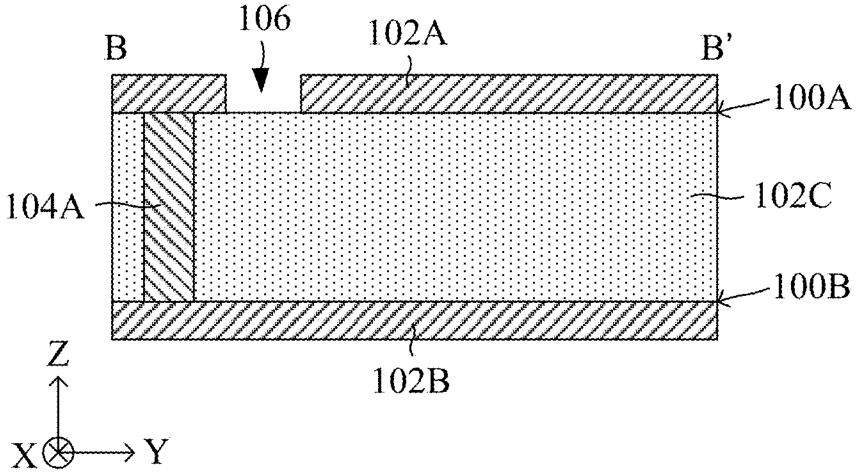
FIG. 2B is a cross-sectional view taken along the section line BB' of the embodiment shown in FIG. 2A.

Please refer to FIG. 2B, which is a cross-sectional view taken along the section line BB' of the embodiment shown in FIG. 2A. As shown in FIG. 2B, the substrate 100 mainly comprises a dielectric layer 102C, the metal layer 102A is formed above the upper surface 100A of the substrate 100 (or the dielectric layer 102C), the metal layer 102B is formed below the lower surface 100B of the substrate 100 (or the dielectric layer 102C), and two terminals of each metal hole 104A are connected to the metal layer 102A and metal layer 102B, respectively. The metal-less area 106 is surrounded by the metal layer 102A and contains no metal therein so that the electromagnetic waves could be transmitted along the Z-axis direction in the metal-less area 106 without being shielded by the metal layer 102A.

Figure 2C:
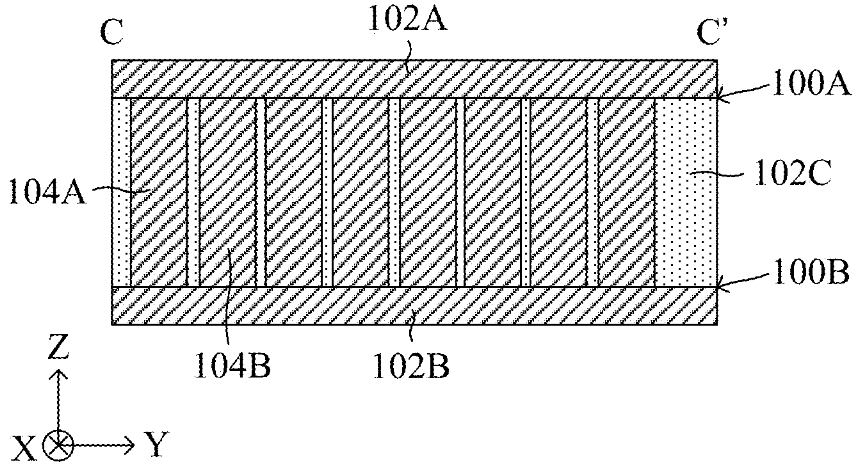
FIG. 2C is a cross-sectional view taken along the section line CC' of the embodiment shown in FIG. 2A.

Please refer to FIG. 2C, which is a cross-sectional view taken along the section line CC' of the embodiment shown in FIG. 2A. As shown in FIG. 2C, in addition to the two ends of each of the metal holes 104A, the two ends of each of the metal holes 104B are connected to the metal layer 102A and the metal layer 102B, respectively. Therefore, transmission of the electromagnetic waves along the X-axis direction is shielded by the metal holes 104B.

Figure 3A:
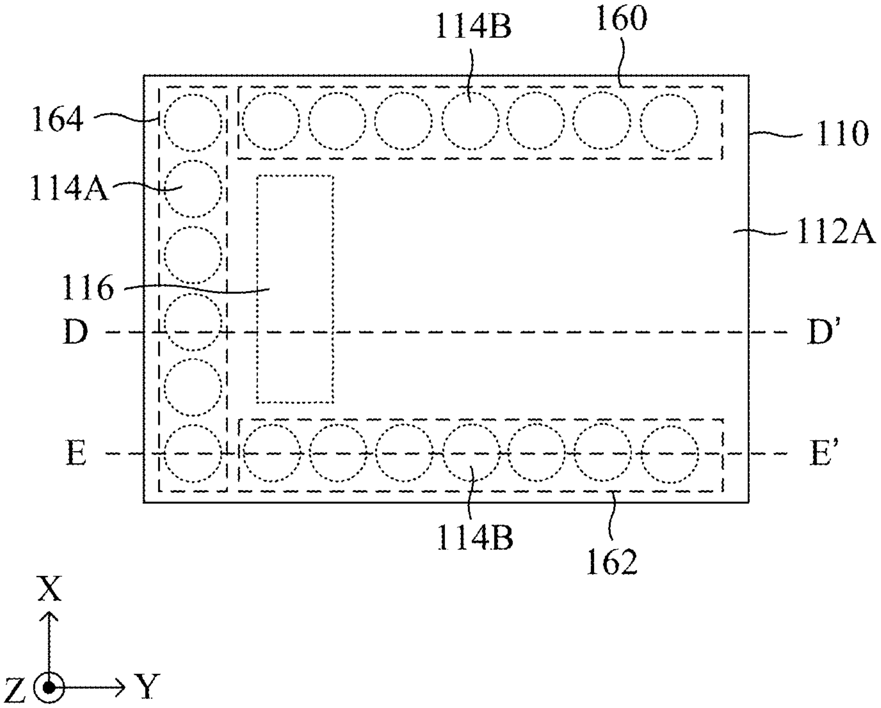
FIG. 3A is a top view of the substrate 110 shown in FIG. 1 in accordance with one embodiment of the present invention.

Please refer to FIG. 3A, which is a top view of the substrate 110 shown in FIG. 1 in accordance with one embodiment of the present invention. As shown in FIG. 3A, a metal layer 112A is disposed above the upper surface of the substrate 110, a metal layer is disposed below the lower surface of the substrate 110, and a plurality of metal holes 114A and 114B are formed below the metal layer 102A in the Z-axis direction. The metal holes 114B are arranged into two hole-rows 160 and 162 along the Y-axis direction, each of the hole-rows 160 and 162 comprises at least two of the metal holes 114B, and the hole-row 160 is separated from the hole-row 162 for a certain distance so that the electromagnetic waves could be transmitted along the Y-axis direction between the space formed between the hole-rows 160 and 162. A metal-less area 116 in which no metal exists is formed within the metal layer disposed below the lower surface of the substrate 110. Furthermore, the metal holes 114A are arranged into a hole-row 164 along the X-axis direction at left side of the metal-less area 116 in the Y-axis direction, so that the hole-row 164 could form a barrier when the electromagnetic waves are transmitted along the Y-axis direction, and interference on electromagnetic waves from outside of the substrate integrated waveguide 10 and probability of dissipation of electromagnetic waves inside the substrate integrated waveguide 10 could be reduced thereby.

Figure 3B:
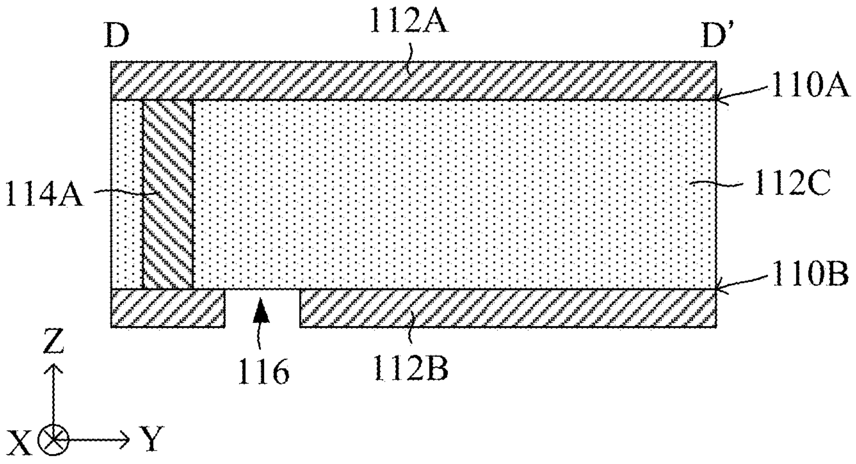
FIG. 3B is a cross-sectional view taken along the section line DD' of the embodiment shown in FIG. 3A.

Please refer to FIG. 3B, which is a cross-sectional view taken along the section line DD' of the embodiment shown in FIG. 3A. As shown in FIG. 3B, the substrate 110 mainly comprises a dielectric layer 112C, the metal layer 112A is formed above the upper surface 110A of the substrate 110 (or the dielectric layer 112C), the metal layer 112B is formed below the lower surface 110B of the substrate 110 (or the dielectric layer 112C), and two terminals of each metal hole 114A are connected to the metal layer 112A and metal layer 112B, respectively. The metal-less area 116 is surrounded by the metal layer 112B and contains no metal therein so that the electromagnetic waves could be transmitted along the Z-axis direction in the metal-less area 116 without being shielded by the metal layer 112B.

Figure 3C:
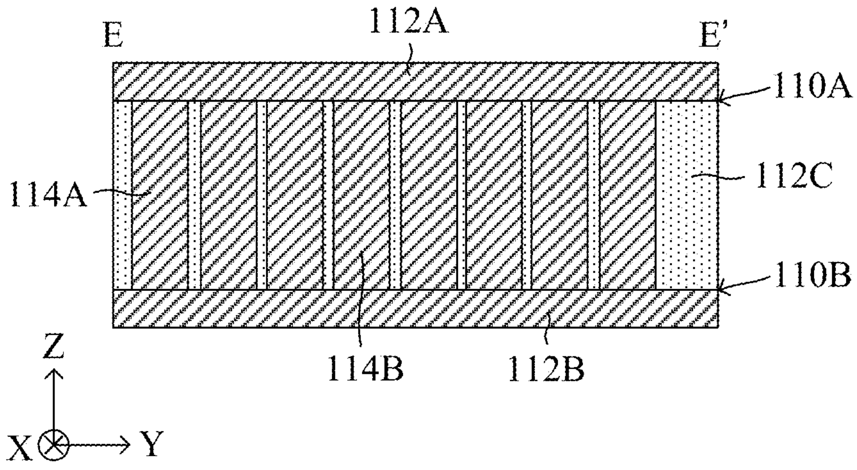
FIG. 3C is a cross-sectional view taken along the section line EE' of the embodiment shown in FIG. 3A.

Please refer to FIG. 3C, which is a cross-sectional view taken along the section line EE' of the embodiment shown in FIG. 3A. As shown in FIG. 3C, in addition to the two ends of each of the metal holes 114A, the two ends of each of the metal holes 114B are connected to the metal layer 112A and the metal layer 112B, respectively. Therefore, transmission of the electromagnetic waves along the X-axis direction is shielded by the metal holes 114B.

It is well known by those with ordinary skill in the art that the parameters, such as the positions, sizes and quantities of the metal holes, should be designed in accordance with real situations to achieve the effect of shielding the transmission of the electromagnetic waves in a specific direction. In other words, the quantity of the metal holes arranged into the hole-row 150 or the hole-row 152 might be the same as or different from the quantity of the metal holes arranged into the hole-row 160 or the hole-row 162. The parameters mentioned above could be calculated by many formulas known by those with ordinary skill in the art and are not discussed in detail here. Basing on the same reasons, those with ordinary skill would know that the parameters shown in the embodiments described in this specification are only for example but not limitations of the present invention. These parameters could be designed and changed in accordance with real requirements.

Figure 4A:
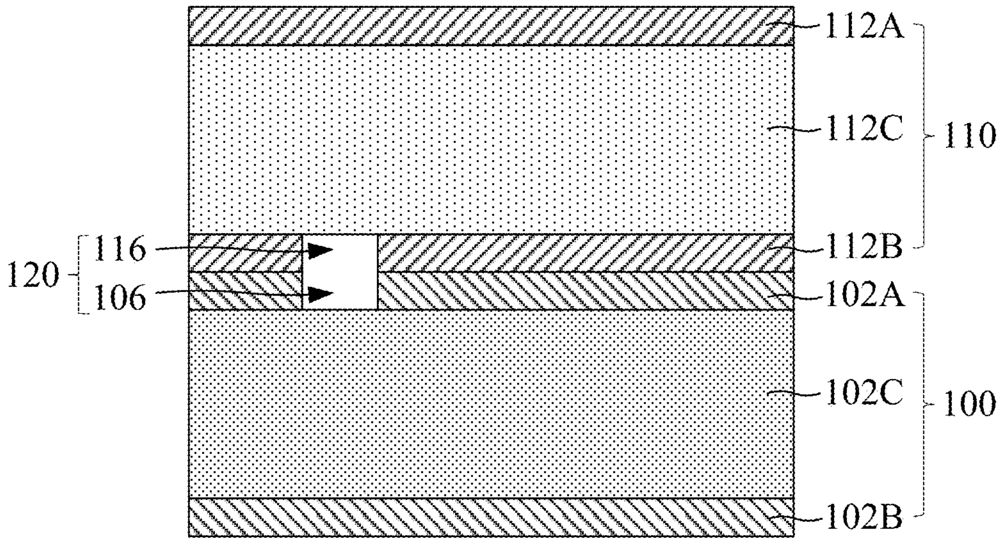
FIG. 4A is a cross-sectional view taken along the section line AA' illustrated in FIG. 1 in accordance with one embodiment of the present invention.

In accordance with the embodiments described with FIG. 2A~2C and FIG. 3A~3C, the cross-sectional view taken along the section line AA' shown in FIG. 1 is illustrated in FIG. 4A. Please refer to FIG. 4A. In this embodiment, the substrate 100 is stacked above the substrate 110, the metal layer 112B is contacted with the metal layer 102A, and a metal-less area 120 is formed by aligning the metal-less area 116 and the metal-less area 106. The electromagnetic waves could be transmitted upwards through the metal-less area 120 to the dielectric layer 112C from the dielectric layer 102C, or, the electromagnetic waves could be transmitted downwards through the metal-less area 120 to the dielectric layer 102C from the dielectric layer 112C.

It is noted that, although the substrate integrated waveguide having multiple substrates described in the embodiment above is made by two substrates while each of the two substrates comprises two metal layers, the metal layers 112B and 102A shown in FIG. 4A could be integrated as one metal layer instead. Please refer to FIG. 4B, which is a cross-sectional view taken along the section line AA' illustrated in FIG. 1 in accordance with one embodiment of the present invention. In this embodiment, the metal layers 112B and 102A mentioned above are integrated as the metal layer 400. In this aspect of view, the metal-less area 120 is the same as the metal-less area 106 and the metal-less area 116, the substrate 100 mentioned in the previous embodiments comprises the dielectric layer 102C, the metal layer 102B and the metal layer 400, and the substrate 110 mentioned in the previous embodiments comprises the dielectric layer 112C, the metal layer 112A and the metal layer 400.

Figure 4B:
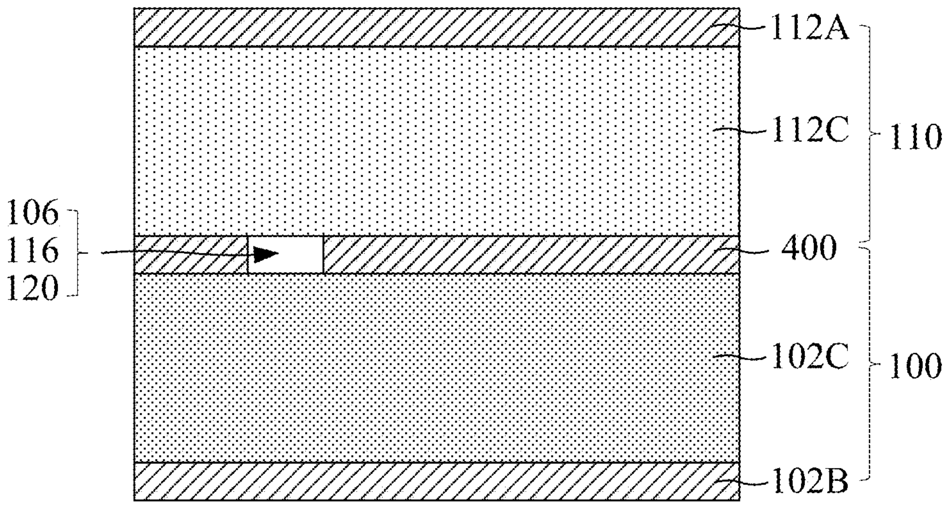
FIG. 4B is a cross-sectional view taken along the section line AA' illustrated in FIG. 1 in accordance with one embodiment of the present invention.
Figure 4C:
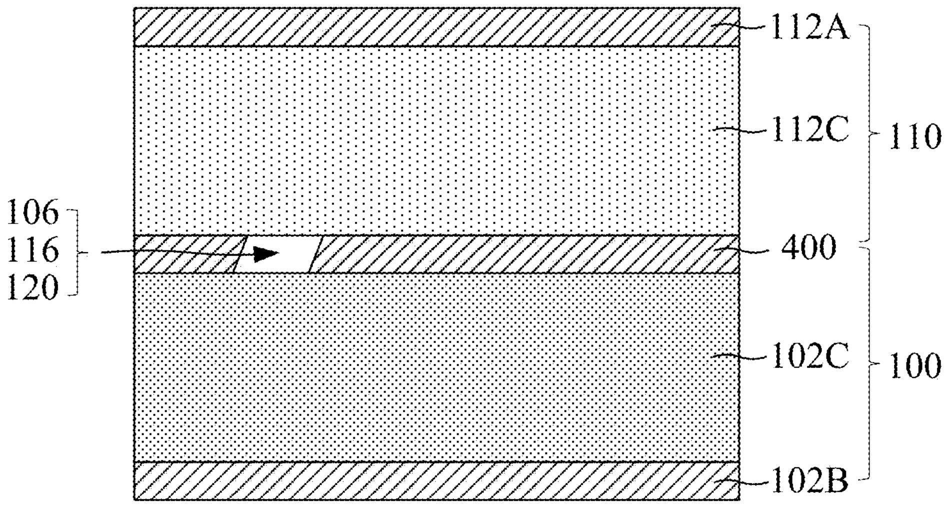
FIG. 4C is a cross-sectional view taken along the section line AA' illustrated in FIG. 1 in accordance with one embodiment of the present invention.

Furthermore, in the previous embodiments, the metal-less area 106, the metal-less area 116 and the metal-less area 120 could be deemed as the range obtained by vertically projected a predetermined area in the X-Y plane onto the metal layer 102A, the metal layer 112B and the metal layer 400, respectively. Instead of a metal-less area extended vertically to the X-Y plane, a metal-less area which extends non-vertically to the X-Y plane could be applied in other embodiments. Please refer to FIG. 4C, which is a cross-sectional view taken along the section line AA' illustrated in FIG. 1 in accordance with another embodiment of the present invention. The major difference between the embodiments shown in FIG. 4B and FIG. 4C is that the metal-less areas 106, 116 and 120 shown in FIG. 4C is a space extended non-vertically to the X-Y plane.

Several embodiments are provided below for those with ordinary skill in the art as references to show how the technique solutions could be applied.

Figure 5A:
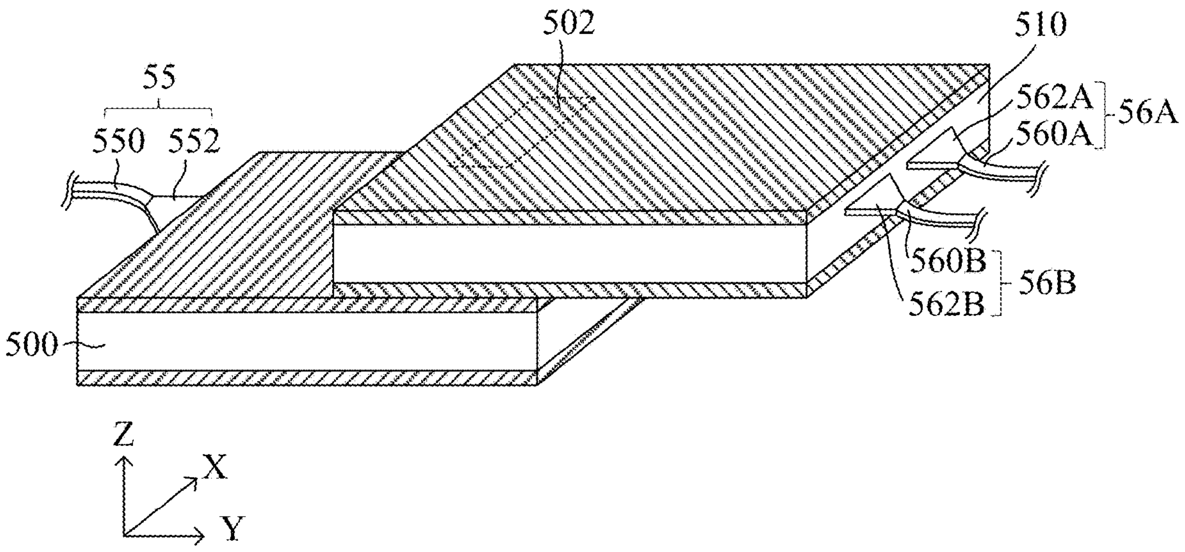
FIG. 5A is a schematic diagram showing outward appearance of a substrate integrated waveguide having multiple substrates in accordance with one embodiment of the present invention.

Please refer to FIG. 5A, which is a schematic diagram showing outward appearance of a substrate integrated waveguide having multiple substrates in accordance with one embodiment of the present invention. In this embodiment, the substrate integrated waveguide comprises a substrate 500 and a substrate 510, wherein a metal-less area 502 is formed within a range over which the substrate 500 and the substrate 510 are overlapped. Furthermore, in the Y-axis direction, an electromagnetic wave transfer structure 55 being capable of receiving or transmitting the electromagnetic waves is connected to the left side of the substrate 500, wherein the electromagnetic wave transfer structure 55 comprises the micro-stripe 550 and tapered lines 552, and two electromagnetic wave transfer structures 56A and 56B being capable of receiving or transmitting the electromagnetic waves are connected to the right side of the substrate 510, wherein the electromagnetic wave transfer structure 56A comprises the micro-stripe 560A and tapered lines 562A, and the electromagnetic wave transfer structure 56B comprises the micro-stripe 560B and tapered lines 562B.

Figure 5B:
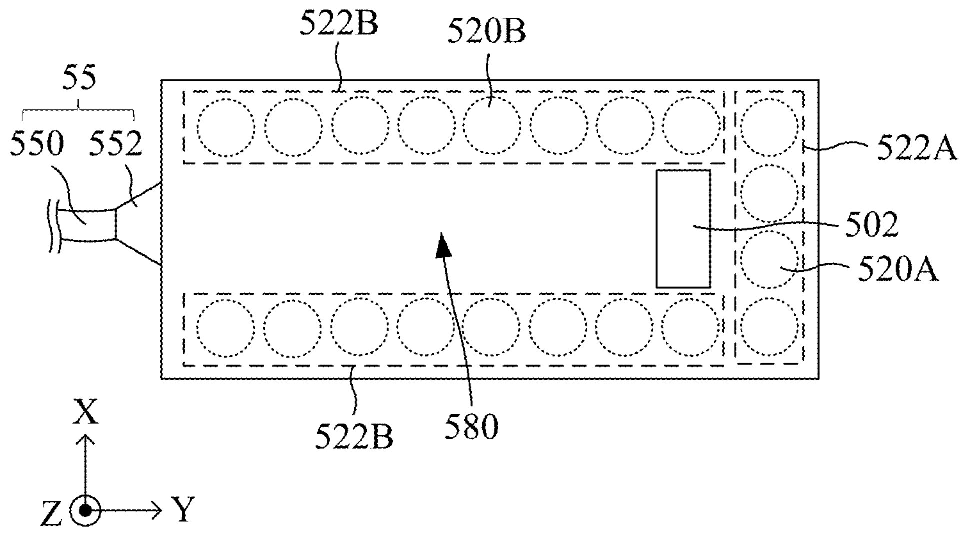
FIG. 5B is a top-side perspective view of the substrate 500 in accordance with one embodiment of the present invention.

Please refer to FIG. 5B, which is a top-side perspective view of the substrate 500 in accordance with one embodiment of the present invention. It is noted that the substrate 500 also comprises a dielectric layer and two metal layers disposed at two opposite sides of the dielectric layer in the Z-axis direction, which is similar to those substrates illustrated in the previous embodiments. As shown in FIG. 5B, in the Y-axis direction, the electromagnetic wave transfer structure 55 is connected to the dielectric layer of the substrate 500 at left side of the metal-less area 502, a plurality of metal holes 520A are arranged into a hole-row 522A at right side of the metal-less area 502, and two ends of each metal hole 520A are connected to the metal layers disposed at two sides of the dielectric layer, respectively. Furthermore, in the X-axis direction, a plurality of metal holes 520B are arranged at two sides of the metal-less area 502 into two hole-rows 522B extended along the Y-axis direction, and two ends of each metal hole 520B are connected to the metal layers disposed at two opposite sides of the dielectric layer of the substrate 500, respectively. The electromagnetic waves transferred through the electromagnetic wave transfer structure 55 to the substrate 500 from outside of the substrate 500 are firstly transmitted along the Y-axis direction from left to right through the electromagnetic wave channel 580 formed between the two hole-rows 522B and the two metal layers disposed at two sides of the dielectric layer, and are further transmitted from the substrate 500 to the substrate 510 through the metal-less area 502. Relatively, after the electromagnetic waves are transmitted from the substrate 510 to the substrate 500 through the metal-less area 502, the electromagnetic waves are firstly transmitted along the Y-axis direction from right to left through the electromagnetic wave channel 580 and then sent away from the substrate 500 through the electromagnetic wave transfer structure 55.

Figure 5C:
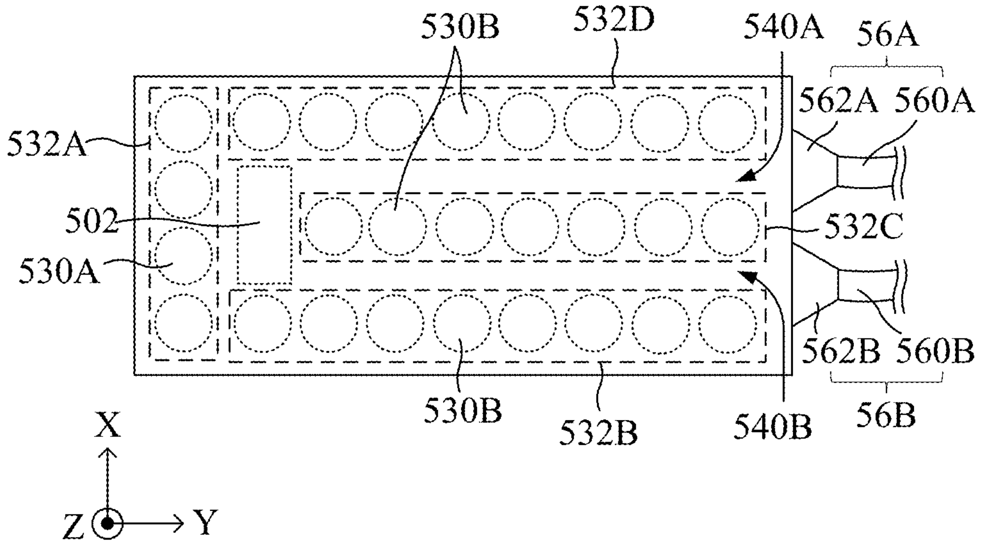
FIG. 5C is a top-side perspective view of the substrate 510 in accordance with one embodiment of the present invention.

Please refer to FIG. 5C, which is a top-side perspective view of the substrate 510 in accordance with one embodiment of the present invention. It is noted that the substrate 510 also comprises a dielectric layer and two metal layers disposed at two opposite sides of the dielectric layer in the Z-axis direction, which is similar to those substrates illustrated in the previous embodiments. As shown in FIG. 5C, in the Y-axis direction, the electromagnetic wave transfer structures 56A and 56B are both connected to the dielectric layer of the substrate 510 at right side of the metal-less area 502, a plurality of metal holes 530A are arranged into a hole-row 532A at left side of the metal-less area 502, and two ends of each metal hole 530A are connected to the metal layers disposed at two opposite sides of the dielectric layer of the substrate 510, respectively. Furthermore, in the X-axis direction, a plurality of metal holes 530B are arranged into three hole-rows 532B, 532C and 532D extended along the Y-axis direction, and two ends of each metal hole 530B are connected to the metal layers disposed at two opposite sides of the dielectric layer of the substrate 510, respectively. The electromagnetic waves transferred through the electromagnetic wave transfer structure 56A to the substrate 510 from outside of the substrate 510 are firstly transmitted along the Y-axis direction from right to left through the corresponded electromagnetic wave channel 540A formed between the two hole-rows 532D and 532C and the two metal layers disposed at two opposite sides of the dielectric layer, and are further transmitted from the substrate 510 to the substrate 500 through the metal-less area 502. Similarly, the electromagnetic waves transferred through the electromagnetic wave transfer structure 56B to the substrate 510 from outside of the substrate 510 are firstly transmitted along the Y-axis direction from right to left through the corresponded electromagnetic wave channel 540B formed between the two hole-rows 532C and 532B and the two metal layers disposed at two opposite sides of the dielectric layer, and are further transmitted from the substrate 510 to the substrate 500 through the metal-less area 502. Relatively, after the electromagnetic waves are transmitted from the substrate 500 to the substrate 510 through the metal-less area 502, the electromagnetic waves are firstly transmitted along the Y-axis direction from left to right through the electromagnetic wave channels 540A and 540B and then sent away from the substrate 510 through the corresponded electromagnetic wave transfer structures 56A and 56B.

While applying the technique solutions described in the above embodiments, the technique effect of transmitting signals from one signal source to multiple target objects or from multiple signal sources to one target object could be achieved by using the substrate integrated waveguide. Furthermore, in accordance with the spirit of the technique solutions provided above, the technique effect of transferring signals from multiple signal sources to multiple target objects could be achieved by adjusting quantities of the electromagnetic channels and the electromagnetic wave transfer structures.

Figure 6A:
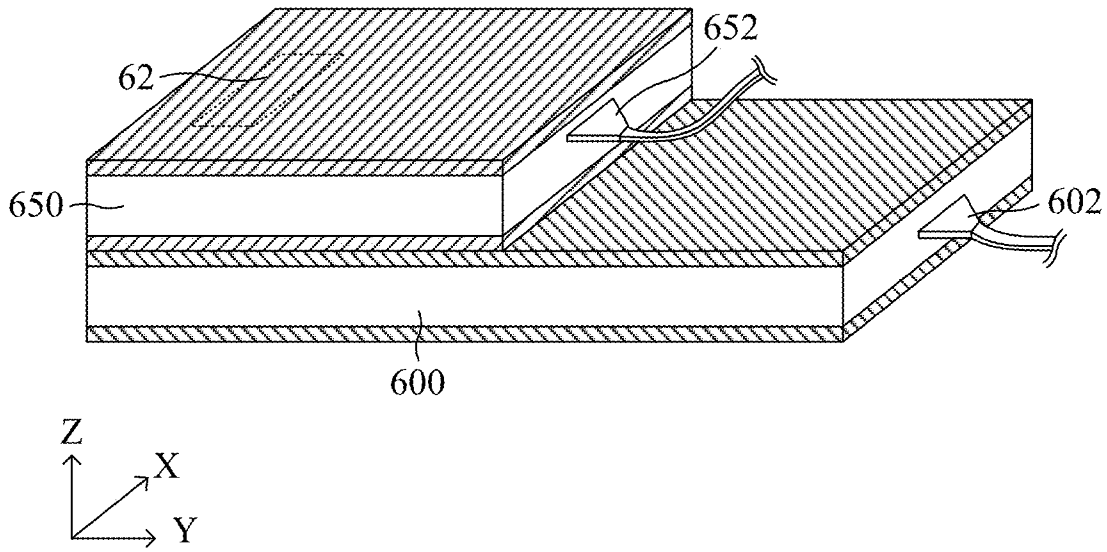
FIG. 6A is a schematic diagram showing outward appearance of a substrate integrated waveguide having multiple substrates in accordance with one embodiment of the present invention.

Please refer to FIG. 6A, which is a schematic diagram showing outward appearance of a substrate integrated waveguide having multiple substrates in accordance with one embodiment of the present invention. In this embodiment, the substrate integrated waveguide comprises the substrates 600 and 650, and a metal-less area 62 is formed within a range where the substrate 600 overlaps with the substrate 650. In the Y-axis direction, the electromagnetic wave transfer structure 602 configured for receiving or transmitting electromagnetic waves is connected to right side of the substrate 600, and the electromagnetic wave transfer structure 652 configured for receiving or transmitting electromagnetic waves is connected to right side of the substrate 650. Furthermore, each of the substrates 600 and 650 also comprises a dielectric layer and two metal layers disposed at two opposite sides of the dielectric layer in the Z-axis direction, which is similar to those substrates illustrated in the previous embodiments.

Figure 6B:
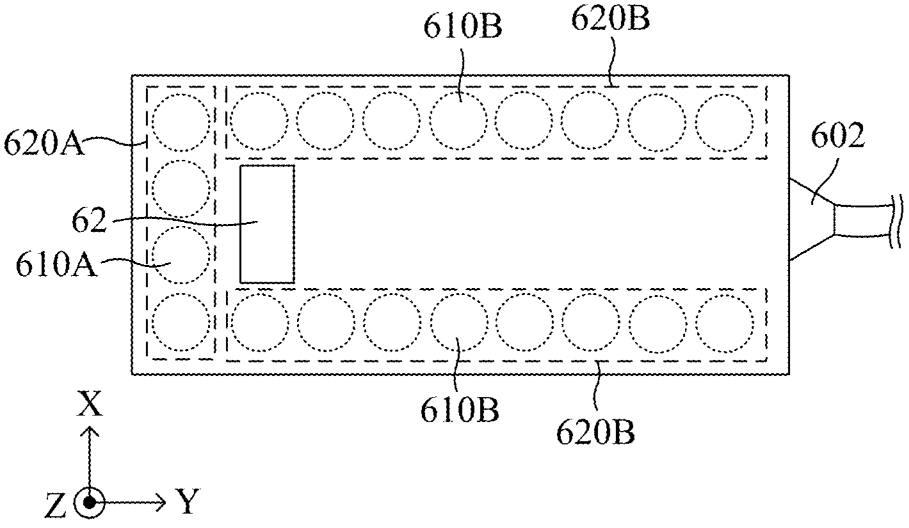
FIG. 6B is a top-side perspective view of the substrate 600 in accordance with one embodiment of the present invention.

Please refer to FIG. 6B, which is a top-side perspective view of the substrate 600 in accordance with one embodiment of the present invention. As shown in FIG. 6B, in the Y-axis direction, the electromagnetic wave transfer structure 602 is connected to the dielectric layer of the substrate 600 at right side of the metal-less area 62, a plurality of metal holes 610A are arranged into a hole-row 620A at left side of the metal-less area 62, and two ends of each metal hole 610A are connected to the metal layers disposed at two opposite sides of the dielectric layer of the substrate 600, respectively. Furthermore, in the X-axis direction, a plurality of metal holes 610B are arranged at two sides of the metal-less area 62 into two hole-rows 620B extended along the Y-axis direction, and two ends of each metal hole 610B are connected to the metal layers disposed at two opposite sides of the dielectric layer of the substrate 600, respectively. The electromagnetic waves transferred through the electromagnetic wave transfer structure 602 to the substrate 600 from outside of the substrate 600 are firstly transmitted in the Y-axis direction from right to left through the electromagnetic wave channel formed between the two hole-rows 620B and the two metal layers disposed at two opposite sides of the dielectric layer of the substrate 600, and are further transmitted from the substrate 600 to the substrate 650 through the metal-less area 62. Relatively, after the electromagnetic waves are transmitted from the substrate 650 to the substrate 600 through the metal-less area 62, the electromagnetic waves are firstly transmitted in the Y-axis direction from left to right through the electromagnetic wave channel formed in the substrate 600 and then sent away from the substrate 600 through the electromagnetic wave transfer structure 602.

Figure 6C:
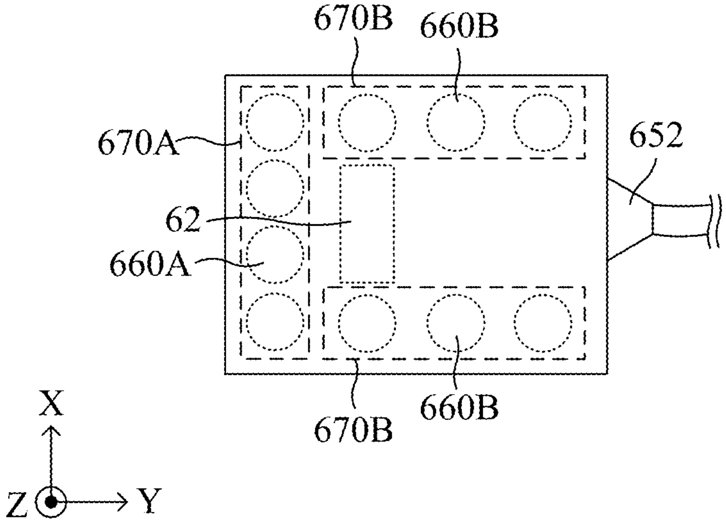
FIG. 6C is a top-side perspective view of the substrate 650 in accordance with one embodiment of the present invention.

Please refer to FIG. 6C, which is a top-side perspective view of the substrate 650 in accordance with one embodiment of the present invention. As shown in FIG. 6C, in the Y-axis direction, the electromagnetic wave transfer structures 652 is connected to the dielectric layer of the substrate 650 at right side of the metal-less area 62, a plurality of metal holes 660A are arranged into a hole-row 670A at left side of the metal-less area 62, and two ends of each metal hole 660A are connected to the metal layers disposed at two opposite sides of the dielectric layer of the substrate 650, respectively. Furthermore, in the X-axis direction, a plurality of metal holes 660B are arranged into two hole-rows 670B extended along the Y-axis direction, and two ends of each metal hole 660B are connected to the metal layers disposed at two opposite sides of the dielectric layer of the substrate 650, respectively. The electromagnetic waves transferred through the electromagnetic wave transfer structure 652 to the substrate 650 from outside of the substrate 650 are firstly transmitted along the Y-axis direction from right to left through the electromagnetic wave channel formed between the two hole-rows 670B and the two metal layers disposed at two opposite sides of the dielectric layer of the substrate 650, and are further transmitted from the substrate 650 to the substrate 600 through the metal-less area 62. Relatively, after the electromagnetic waves are transmitted from the substrate 600 to the substrate 650 through the metal-less area 62, the electromagnetic waves are firstly transmitted along the Y-axis direction from left to right through the electromagnetic wave channels formed in the substrate 650 and then sent away from the substrate 650 through the electromagnetic wave transfer structure 652.

By using the technique solutions provided above, the transmission direction of the electromagnetic waves could be changed when it is necessary so that the circuit layout could be more flexible.

Figure 7A:
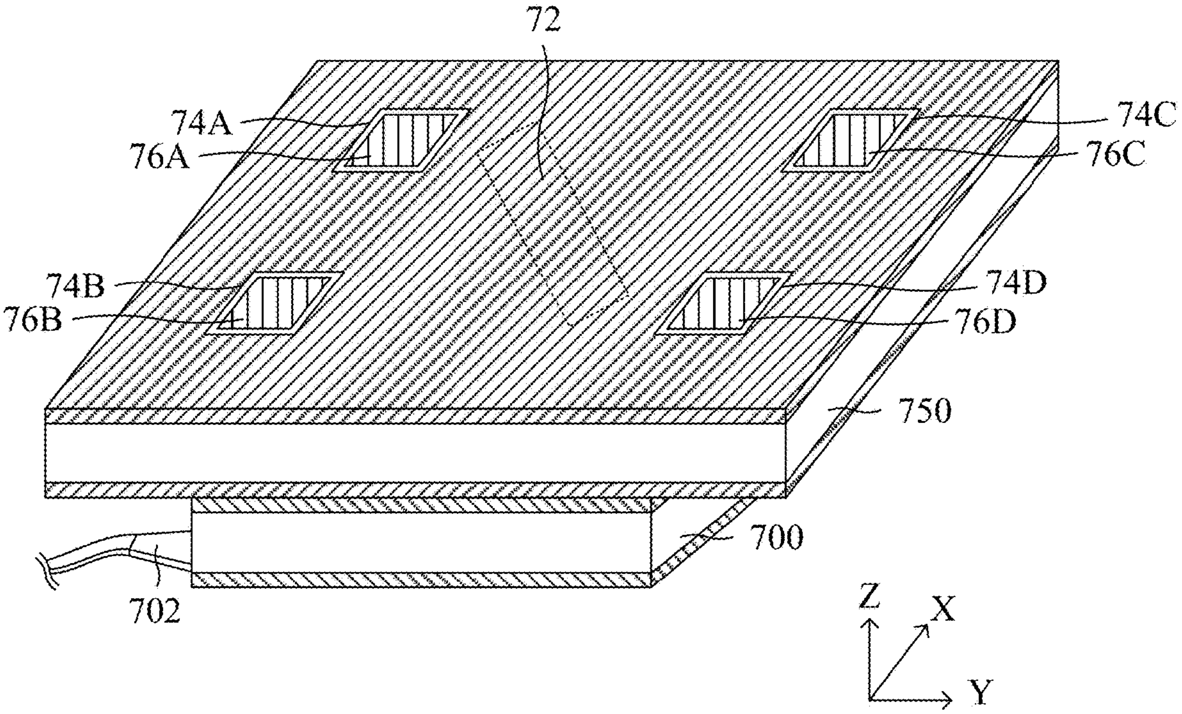
FIG. 7A is a schematic diagram showing outward appearance of a substrate integrated waveguide having multiple substrates in accordance with one embodiment of the present invention.

Please refer to FIG. 7A, which is a schematic diagram showing outward appearance of a substrate integrated waveguide having multiple substrates in accordance with one embodiment of the present invention. In this embodiment, the substrate integrated waveguide comprises the substrates 700 and 750, and a metal-less area 72 is formed within a range where the substrate 700 overlaps with the substrate 750. The electromagnetic wave transfer structure 702 configured for receiving or transmitting electromagnetic waves is connected to left side of the substrate 700 in the Y-axis direction, a plurality of electromagnetic wave transfer structures 74A, 74B, 74C and 74D which are configured for receiving or transmitting electromagnetic waves are connected to upper side of the substrate 750 in the Z-axis direction, and one of the antenna patterns 76A, 76B, 76C and 76D is disposed in one of the electromagnetic wave transfer structures 74A, 74B, 74C and 74D to receive or transmit the electromagnetic waves. Furthermore, each of the substrates 700 and 750 also comprises a dielectric layer and two metal layers disposed at two opposite sides of the dielectric layer in the Z-axis direction, which is similar to those substrates illustrated in the previous embodiments.

Figure 7B:
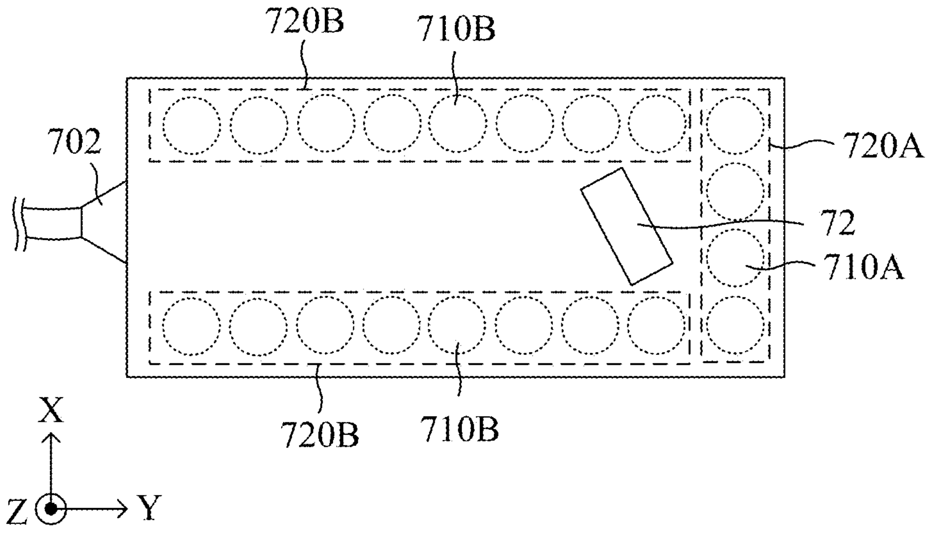
FIG. 7B is a top-side perspective view of the substrate 700 in accordance with one embodiment of the present invention.

Please refer to FIG. 7B, which is a top-side perspective view of the substrate 700 in accordance with one embodiment of the present invention. As shown in FIG. 7B, in the Y-axis direction, the electromagnetic wave transfer structure 702 is connected to the dielectric layer of the substrate 700 at left side of the metal-less area 72, a plurality of metal holes 710A are arranged into a hole-row 720A at right side of the metal-less area 72, and two ends of each metal hole 710A are connected to the metal layers disposed at two opposite sides of the dielectric layer of the substrate 700, respectively. Furthermore, in the X-axis direction, a plurality of metal holes 710B are arranged at two opposite sides of the metal-less area 72 into two hole-rows 720B extended along the Y-axis direction, and two ends of each metal hole 710B are connected to the metal layers disposed at two opposite sides of the dielectric layer of the substrate 700, respectively. The electromagnetic waves transferred through the electromagnetic wave transfer structure 702 to the substrate 700 from outside of the substrate 700 are firstly transmitted in the Y-axis direction from left to right through the electromagnetic wave channel formed between the two hole-rows 720B and the two metal layers disposed at two opposite sides of the dielectric layer of the substrate 700, and are further transmitted from the substrate 700 to the substrate 750 through the metal-less area 72. Relatively, after the electromagnetic waves are transmitted from the substrate 750 to the substrate 700 through the metal-less area 72, the electromagnetic waves are firstly transmitted in the Y-axis direction from right to left through the electromagnetic wave channel formed in the substrate 700 and then sent away from the substrate 700 through the electromagnetic wave transfer structure 702.

Figure 7C:
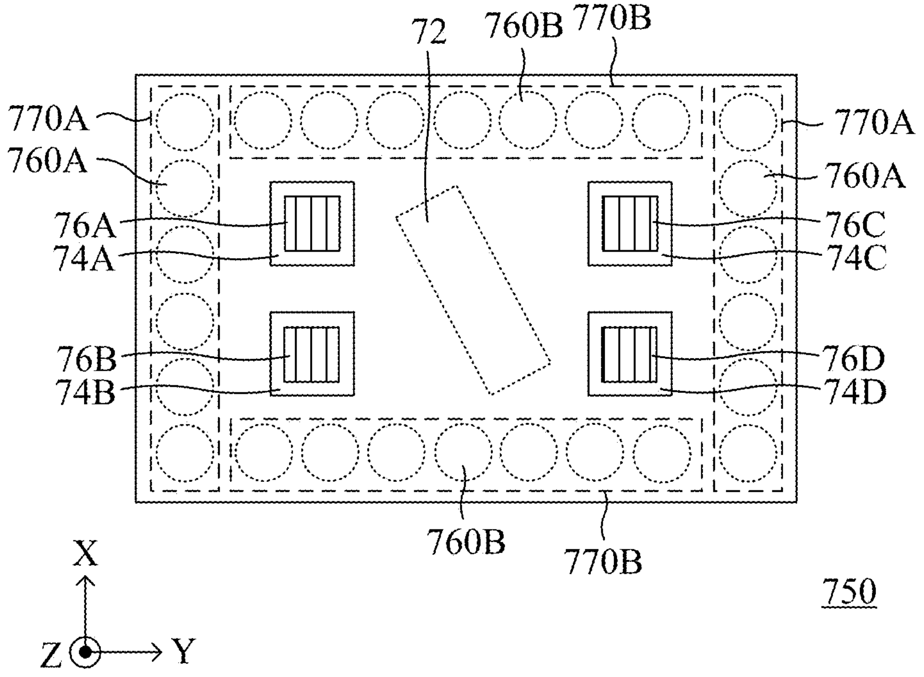
FIG. 7C is a top-side perspective view of the substrate 750 in accordance with one embodiment of the present invention.

Please refer to FIG. 7C, which is a top-side perspective view of the substrate 750 in accordance with one embodiment of the present invention. As shown in FIG. 7C, in the X-Y plane, the antenna patterns 76A, 76B, 76C and 76D are formed at the metal layer disposed on the upper side of the substrate 700 in the Z-direction and are arranged around a projection area on which the metal-less area 72 is vertically projected. Because the antenna patterns 76A~76D are arranged around the projection area, a plurality of metal holes 760A and 760B are arranged around outer periphery of the antenna patterns 76A~76D into two hole-rows 770A extended along the X-axis direction and two hole-rows 770B extended along the Y-axis direction, wherein, two ends of each of the metal holes 760A and 760B are connected to the metal layers disposed on opposite sides of the dielectric layer of the substrate 750, and the hole-rows 770A and 770B together form a barrier for preventing the electromagnetic waves penetrating therefrom. In this embodiment, the electromagnetic waves transmitted from the substrate 700 to the substrate 750 through the metal-less area 72 could be freely transmitted in the space surrounded by the hole-rows 770A and 770B and finally broadcasted by the antenna patterns 76A~76D. Relatively, the electromagnetic waves received by the antenna patterns 76A~76D could be reversely transmitted to the substrate 700 from the substrate 750 through the metal-less area 72.

It is noted that the embodiments described above could be adjusted in accordance with actual needs or work together to achieve a specific technique effect. It should be known to those with ordinary skill in the art that the contents mentioned above are only examples for easily explaining the technique solutions provided by the present invention but not limitations of the present invention.

In summary, by applying the technique solutions described above, the substrate integrated waveguide having multiple substrates provided in the present invention could transmit signals in different substrates along either the same or different directions. Therefore, the circuit design made for an electronic component using the substrate integrated waveguide could be more flexible than before.

What is claimed is:

1. A substrate integrated waveguide having multiple substrates, comprising:

a first substrate having a first dielectric layer, a first metal layer and a second metal layer disposed on opposite sides of the first dielectric layer, and a plurality of first metal holes disposed in the first dielectric layer, wherein the first metal holes are arranged into a plurality of first hole-rows along a first direction in which an electromagnetic wave is transmitted in the first dielectric layer, and two terminals of each of the first metal holes are connected to the first metal layer and the second metal layer, respectively; and a second substrate having a second dielectric layer, a third metal layer and a fourth metal layer disposed on opposite sides of the second dielectric layer, and a plurality of second metal holes disposed in the second dielectric layer, wherein the second metal holes are arranged into a plurality of second hole-rows along a second direction in which the electromagnetic wave is transmitted in the second dielectric layer, and two terminals of each of the second metal holes are connected to the third metal layer and the fourth metal layer, respectively;

wherein, the first substrate is stacked with the second substrate, the second metal layer faces the third metal layer, there is no metal within a first metal-less area of the second metal layer and a second metal-less area of the third metal layer such that the electromagnetic wave is transmitted between the first substrate and the second substrate through the first metal-less area and the second metal-less area, a first structure configured for transmitting and receiving the electromagnetic wave is disposed near a first side of the first metal-less area, and a plurality of third metal holes are disposed near a second side of the first metal-less area and arranged into a third hole-row along a third direction perpendicular to the first direction, wherein the first side and the second side are opposite sides of the first metal-less area, and a second structure configured for transferring the electromagnetic wave is disposed on the second substrate near one side of the second metal-less area.

2. The substrate integrated waveguide according to claim 1, wherein an amount of the first hole-rows is the same as an amount of the second hole-rows.

3. The substrate integrated waveguide according to claim 1, wherein an amount of the first hole-rows is not the same as an amount of the second hole-rows.

4. The substrate integrated waveguide according to claim 1, wherein a third structure configured for transferring the electromagnetic wave is disposed on the second substrate near two sides of the second metal-less area.

5. The substrate integrated waveguide according to claim 1, wherein the second metal layer and the third metal layer are integrated as one metal layer.

6. The substrate integrated waveguide according to claim 1, wherein the first metal-less area on the second metal layer is an area on which a predetermined area is vertically projected, and the second metal-less area on the third metal layer is an area on which the predetermined area is vertically projected.

* * * * *